US012785178B2

(12) United States Patent
Mortensen et al.

(10) Patent No.: US 12,785,178 B2
(45) Date of Patent: Nov. 3, 2026

(54) ELECTROCHEMICAL CELL GROMMET

(71) Applicant: Energizer Brands, LLC, St. Louis, MO (US)

(72) Inventors: Erik Mortensen, Middleton, WI (US); Todd Geisser, Middleton, WI (US); Michael Corliss, Middleton, WI (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 16/714,628

(22) Filed: Dec. 13, 2019

(65) Prior Publication Data

US 2020/0194764 A1 Jun. 18, 2020

Related U.S. Application Data

(60) Provisional application No. 62/780,162, filed on Dec. 14, 2018.

(51) Int. Cl.
*H01M 50/109* (2021.01)
*H01M 50/167* (2021.01)

(52) U.S. Cl.
CPC ........ *H01M 50/109* (2021.01); *H01M 50/167* (2021.01)

(58) Field of Classification Search
CPC ........... H01M 50/10–102; H01M 50/107–109; H01M 50/148; H01M 50/152–153; H01M 50/166–171; H01M 50/183–188; H01M 50/40; H01M 50/46–463; H01M 50/469; H01M 50/471–477; H01M 6/02–08;
(Continued)

(56) References Cited

U.S. PATENT DOCUMENTS 4,791,034 A * 12/1988 Dopp .................. H01M 50/183 429/406
5,576,117 A * 11/1996 Morita ................ H01M 50/109 429/162
(Continued)

FOREIGN PATENT DOCUMENTS

CN 106953034 A 7/2017
JP 61055858 A * 3/1986 .......... H01M 2/0413
(Continued)

OTHER PUBLICATIONS

Machine translation of Fukuda, JP-2007026690. Originally available Feb. 1, 2007. (Year: 2007).*
(Continued)

*Primary Examiner* — Nicole M. Buie-Hatcher
*Assistant Examiner* — Jacob Buchanan
(74) *Attorney, Agent, or Firm* — Foley & Lardner LLP

(57) ABSTRACT

A grommet for use in an electrochemical button cell to electrically insulate an anode can from a cathode can of the button cell includes a generally tubular sidewall and a plurality of projections. The generally tubular sidewall has an upper portion and a lower portion extending around a longitudinal axis. The upper portion tapers outwardly and upwardly away from the lower portion. The plurality of projections are spaced apart from one another and extend radially inward from the upper portion of the generally tubular sidewall toward the longitudinal axis.

16 Claims, 7 Drawing Sheets

(58) Field of Classification Search
CPC ....... H01M 6/12–14; H01M 6/16–168; H01M 10/0422–0427; H01M 10/05–0525
See application file for complete search history.

(56) References Cited

U.S. PATENT DOCUMENTS

| | | | | | |
|---|---|---|---|---|---|
| 5,919,586 | A * | 7/1999 | Springstead | H01M 50/109 | 429/164 |
| 6,060,194 | A * | 5/2000 | Lindner | H01M 50/184 | 429/185 |
| 6,372,381 | B1 | 4/2002 | Park et al. | | |
| 6,468,691 | B1 * | 10/2002 | Malay | H01M 50/193 | 429/174 |
| 6,569,563 | B2 | 5/2003 | Adey et al. | | |
| 8,003,251 | B2 | 8/2011 | Syvertsen et al. | | |
| 8,444,840 | B2 | 5/2013 | Stimits et al. | | |
| 8,968,956 | B2 | 3/2015 | Day et al. | | |
| 9,601,723 | B2 | 3/2017 | Nielsen | | |
| 2007/0224500 | A1 * | 9/2007 | White | H01M 12/06 | 429/174 |
| 2008/0090136 | A1 | 4/2008 | Kim et al. | | |
| 2008/0138705 | A1 | 6/2008 | Syvertsen et al. | | |
| 2017/0207491 | A1 | 7/2017 | Tamachi et al. | | |
| 2018/0019447 | A1 | 1/2018 | Adonakis | | |

FOREIGN PATENT DOCUMENTS

| | | | | |
|---|---|---|---|---|
| JP | 2007026690 | A * | 2/2007 | Y02E 60/10 |
| WO | WO-2018/056569 | A1 | 3/2018 | |

OTHER PUBLICATIONS

Machine translation of Yokoyama, JP-61055858-A. Originally published Mar. 20, 1986. (Year: 1986).*
International Search Report and Written Opinion in International Patent Application No. PCT/US2019/066406 dated Apr. 9, 2020 (7 pages).

* cited by examiner

ELECTROCHEMICAL CELL GROMMET

CROSS-REFERENCE TO RELATED APPLICATION

This Application claims the benefit of and priority to U.S. Provisional Patent Application No. 62/780,162, entitled "Electrochemical Cell Grommet," filed Dec. 14, 2018, the content of which is hereby incorporated by reference in its entirety.

BACKGROUND

Electromechanical button cells are typically small, single-cell batteries suitable for use in applications in which the space available for a battery is minimal, such as in hearing aids, watches, calculators, pacemakers, and other small electrically-powered devices. "Button cell" is a generally descriptive term related to the shape of the cell, which is disc-shaped, like a garment button.

Metal-air cells are a commonly-used type of button cell having a high energy density. Metal-air cells have a metal-containing anode and an air cathode. Size constraints created by the size of the device to be powered or the connection location influence the allowable size of button cells, which in turn limits the overall capacity of each cell. Because the size and shape of the cathode is generally uniform in all button cells in each respective package size classification, the shape and size of the interior components, including a dielectric and an anode are manipulated to adjust the button cell energy capacity. Even with relatively high energy density, the small size and limited amount of electrochemically reactive material in metal-air cells limits the useful operating life of the cell. To overcome these limitations, metal-air cells are made to be readily replaceable and mass-producible.

SUMMARY

The present disclosure relates generally to a grommet and an electromechanical button cell having a grommet. The grommet is used to electrically insulate an anode can from a cathode can in the button cell. The grommet is constructed of a dielectric material and includes a generally tubular sidewall and a discontinuous pull ring extending radially inward from the sidewall. The discontinuous pull ring resists part stacking and overcomes several problems associated with the mass production of grommets, including component stacking and sporadic mold ejection. The discontinuous pull ring is more effective at resisting stacking, or nesting, of parts within each other as they are processed after the molding operation. Because the projections have a maximum inward projection at a single point, the amount of plastic that needs to be compressed or displaced during the battery closure process is greatly reduced compared to a continuous pull ring. This configuration alleviates the need to provide an increased gap between the metal can and metal top, which in turn maximizes the internal cell volume. The discontinuous pull rings are also sufficient to be used as molding aids, so that when the injection mold is separated, the metal detents within the core pin used to create the inward projections pull the grommet along with the core pin so that each grommet remains fully attached to the core pin after full mold separation. The grommets can then be easily extracted from the core pin for further processing.

In some embodiments, a grommet for use in an electrochemical button cell is provided. The grommet has a generally tubular sidewall. The sidewall has an upper portion and a lower portion extending around a longitudinal axis. The upper portion tapers outwardly and upwardly away from the lower portion. A plurality of projections extend radially inwardly from the upper portion of the generally tubular sidewall toward the longitudinal axis. The plurality of projections are spaced apart from one another angularly. In some examples, the plurality of projections includes at least four projections that are evenly spaced apart from adjacent projections angularly about the circumference of the grommet.

In some embodiments, an electrochemical cell is provided. The electrochemical cell includes a cathode, an anode, and a grommet. The cathode includes an electrically conductive cathode can having a bottom wall and a sidewall extending up from the base. The bottom wall and sidewall together define a cavity of the cathode can. The anode includes an electrically conductive anode can having a top wall and a sidewall extending from the top wall. The top wall and the sidewall of the anode can together define a cavity of the anode can. The anode can is at least partially disposed in the cathode can. At least a portion of the anode can sidewall is in a generally opposed relationship with at least a portion of the cathode can sidewall. The grommet has a generally tubular sidewall. The sidewall has an upper portion and a lower portion extending around a longitudinal axis. The upper portion tapers outwardly and upwardly away from the lower portion. A plurality of projections extend radially inwardly from the upper portion of the generally tubular sidewall toward the longitudinal axis. The plurality of projections are spaced apart from one another angularly. The sidewall of the grommet is disposed between the opposed portions of the anode can sidewall and the cathode can sidewall.

In some embodiments, an electrochemical cell is provided. The electrochemical cell includes a cathode, an anode, electrochemical material, and a grommet. The cathode includes an electrically conductive cathode can. The anode includes an electrically conductive anode can at least partially disposed within the cathode can. The electrochemical material is disposed within the anode can. The grommet is positioned between the cathode can and the anode can, and includes a generally tubular sidewall extending around a longitudinal axis. A plurality of projections that are spaced apart from one another extend radially inward from the generally tubular sidewall toward the longitudinal axis.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1A:
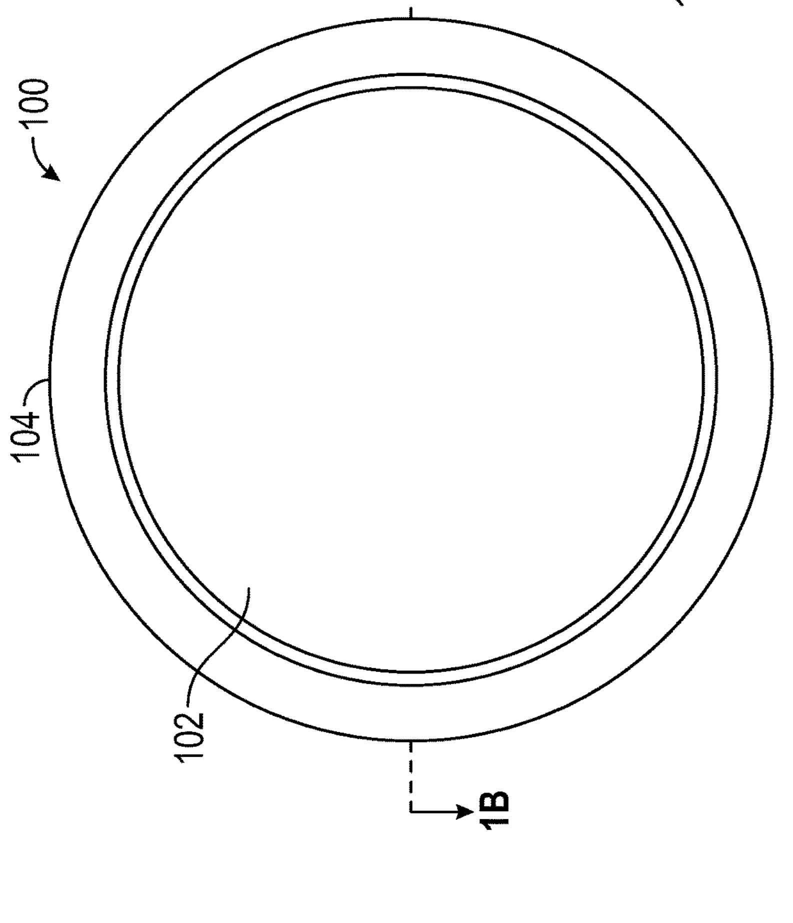
FIG. 1A is a top view of an electrochemical button cell according to embodiments of the disclosure.
Figure 1B:
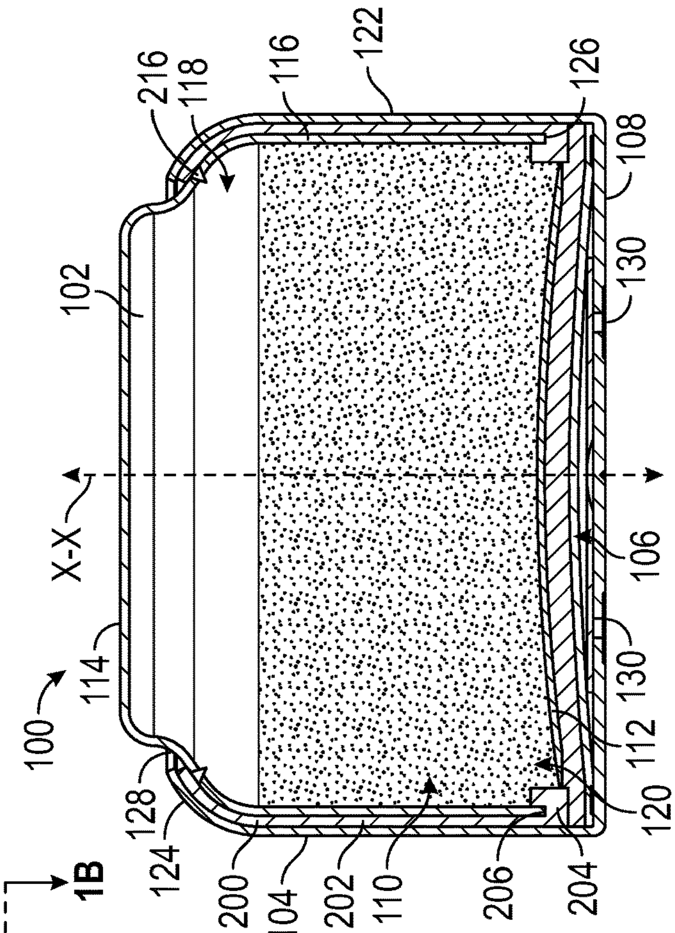
FIG. 1B is a cross-sectional view of the electrochemical button cell of FIG. 1A, taken along lines 1B-1B in FIG. 1A.
Figure 2A:
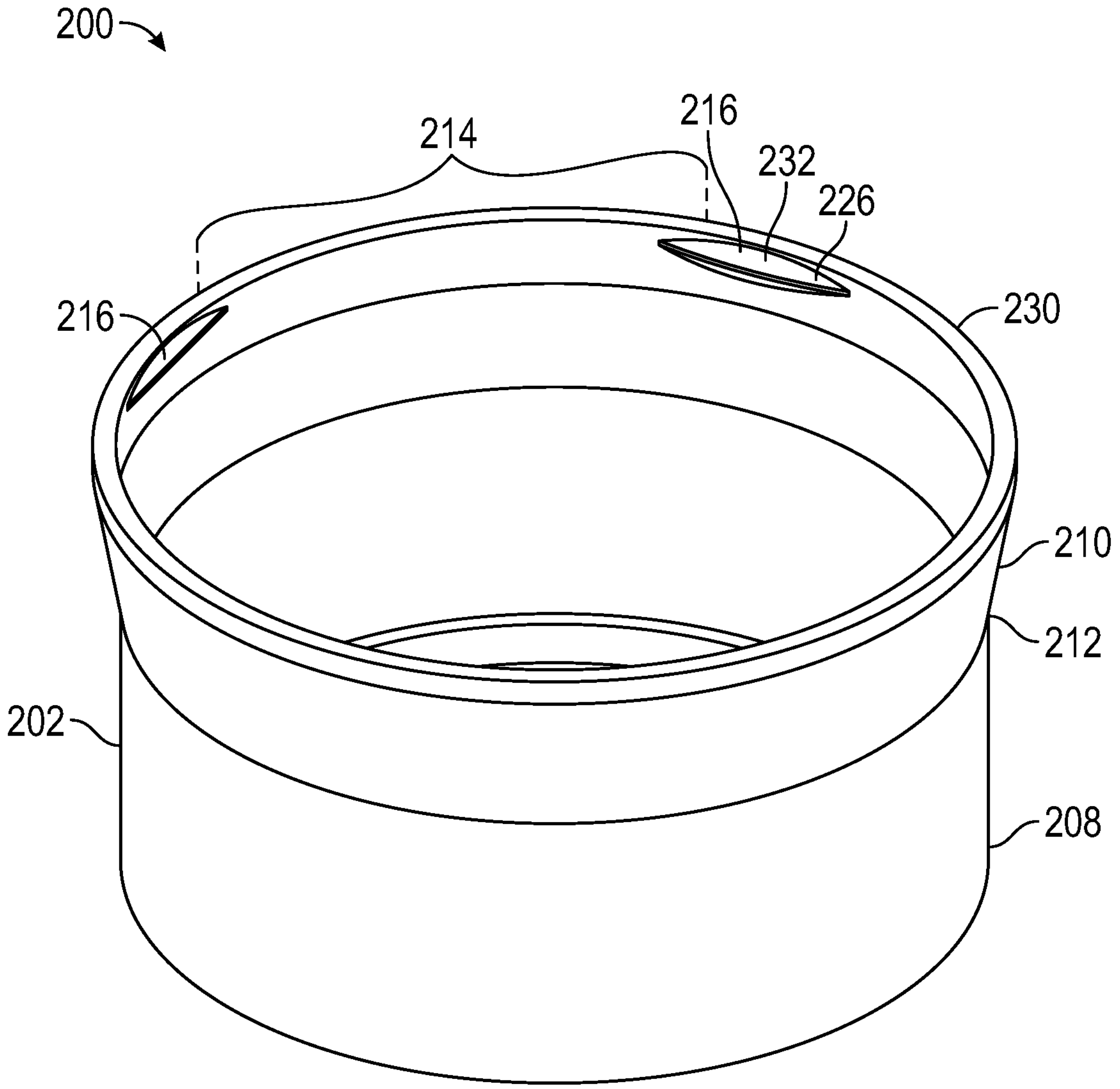
FIG. 2A is a perspective view of a grommet present in the electrochemical button cell of FIG. 1A.
Figure 2B:
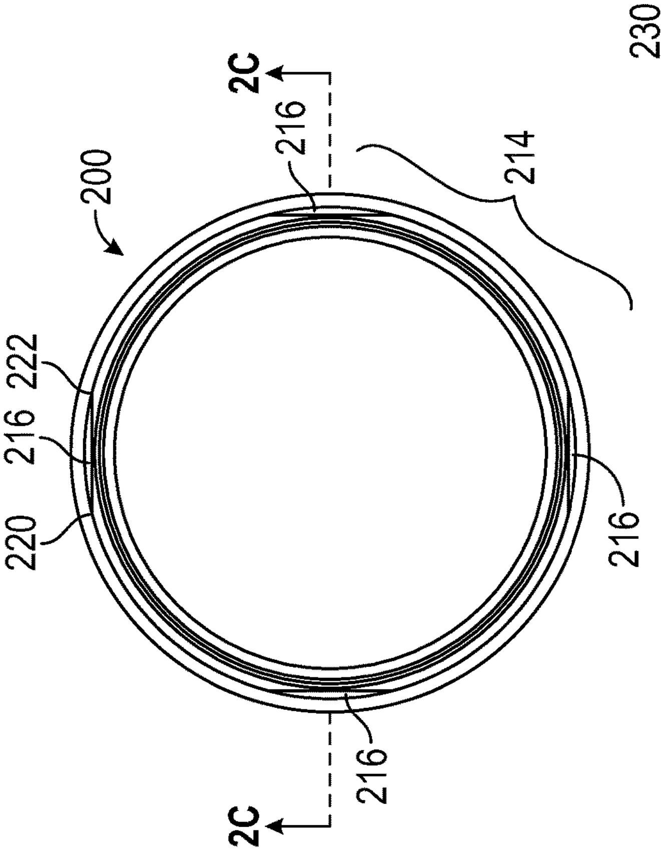
FIG. 2B is a top view of the grommet of FIG. 2A.
Figure 2C:
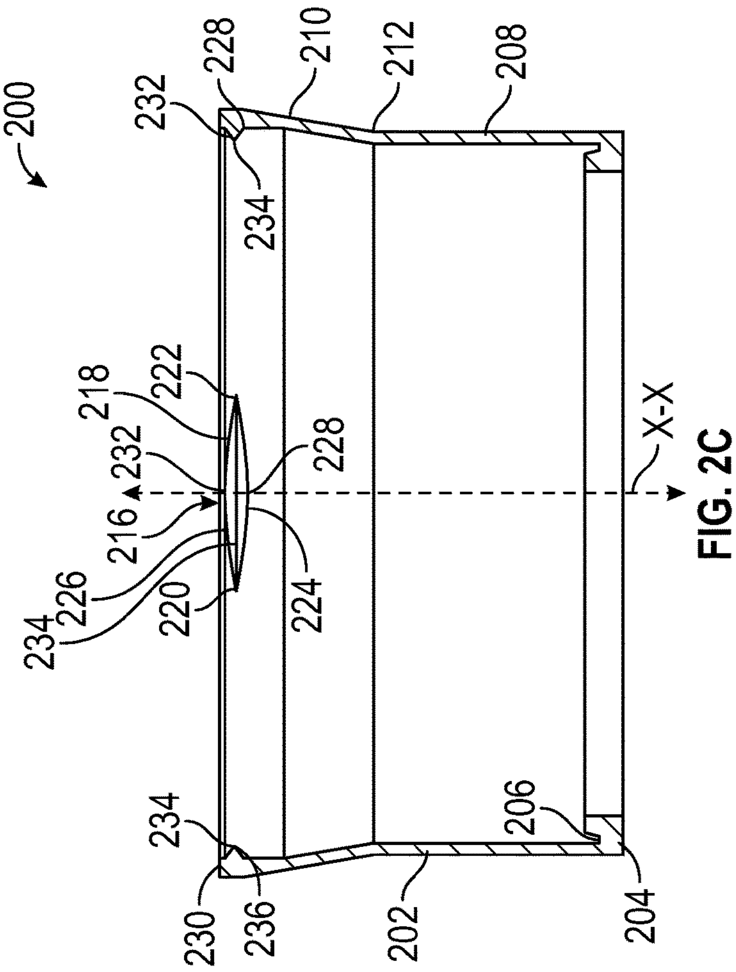
FIG. 2C is a cross-sectional view of the grommet of FIG. 2A, taken along lines 2C-2C in FIG. 2B.
Figure 2D:
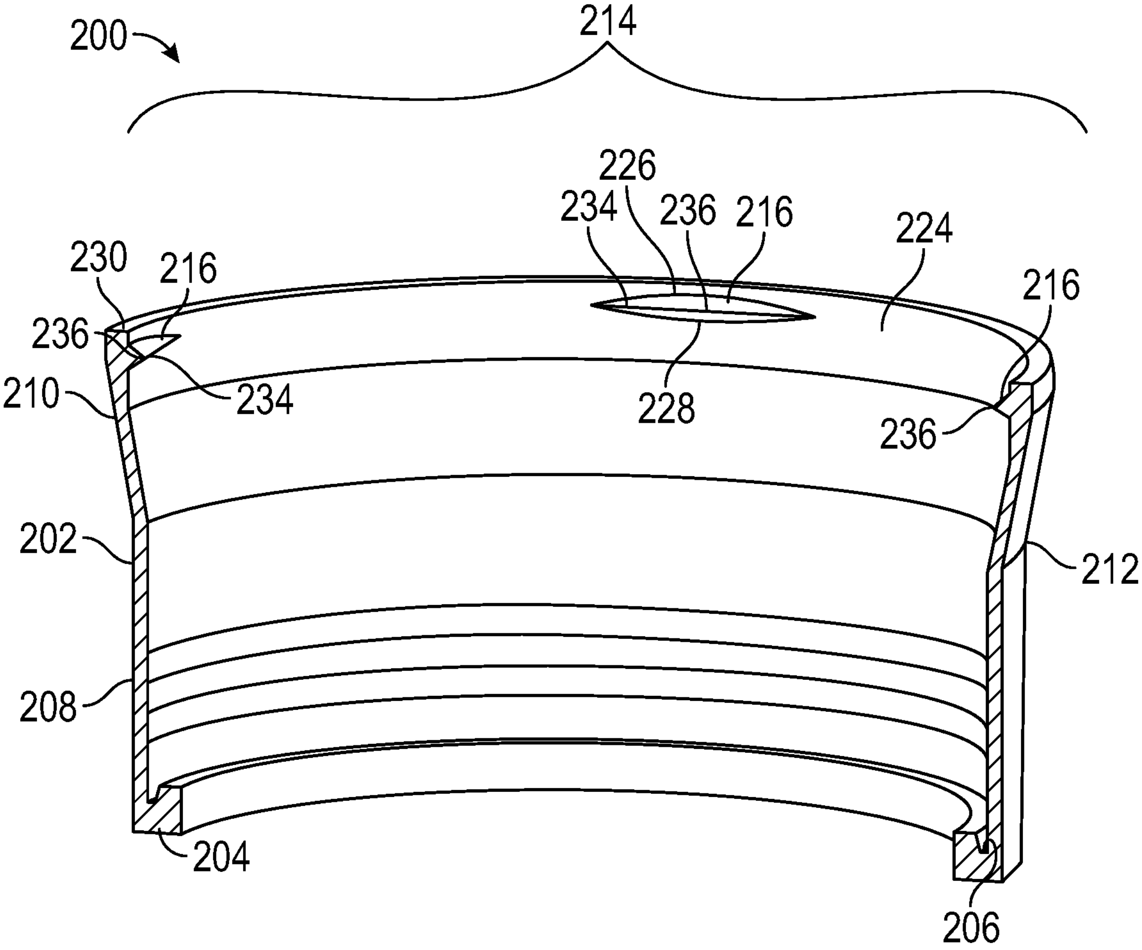
FIG. 2D is a perspective view of the cross-sectional view of FIG. 2C.

Referring to FIGS. 1A and 1B, an electrochemical button cell 100 is illustrated according to embodiments of the present disclosure. The button cell 100 is a metal-air button cell that includes an electrically conductive anode can 102 received in an electrically conductive cathode can 104. An air cathode assembly 106 overlays a bottom wall 108 of the cathode can 104 within the cell 100 and is in electrical contact with the cathode can 104. Anode material 110, which can be a mixture of metal powder (e.g., zinc, lithium) and an electrolyte (e.g., a solution of potassium hydroxide and water) is contained within and in electrical contact with the anode can 102. A separator 112 separates the air cathode assembly 106 from the anode material 110. A top wall 114 of the anode can 102 and the bottom wall 108 of the cathode can 104 can be engaged by one or more terminals of an electronic device, for example.

The anode can 102 has a top wall 114 and a sidewall 116 extending away (e.g., downward, in the orientation illustrated) from the top wall 114. In some embodiments, the sidewall 116 can extend both downwardly and outwardly away from the top wall 114 to define a cavity 118 that can receive and/or store anode material 110. The sidewall 116 and top wall 114 can together define a generally bell-shaped anode can 102. The anode can 102 is at least partially received within a cavity 120 in the cathode can 104. In some embodiments, the cathode can 104 has a generally planar bottom wall 108 and a sidewall 122 extending away (e.g., upward, in the orientation illustrated) from the bottom wall 108 to define the cavity 120. The sidewall 122 can extend orthogonally away from the bottom wall 108, for example. The sidewall 122 can be crimped so that an upper portion 124 of the sidewall 122 curves radially inward and extends above a portion of the bottom wall 108 to retain the anode can 102 and a grommet 200 within the cavity 120 and to help seal electrochemical anode material 110 within the button cell 100, as explained below.

A generally cylindrical, and more particularly annular, thin-walled dielectric (e.g., electrically non-conductive) grommet 200 (also commonly referred to as a "gasket" or "seal") electrically insulates the anode can 102 from direct electrical contact with the cathode can 104. For example, the grommet 200 can be disposed between the opposing sidewalls 116, 122 of the anode can 102 and cathode can 104 respectively. The grommet 200 can then form a seal between the anode can 102 and the cathode can 104 to enclose and secure reactive materials within the cell 100. The grommet 200, which is shown in additional detail in FIGS. 2A-2D, has an annular or generally tubular sidewall 202 extending about a longitudinal axis X-X. An integrally-formed foot 204 extends radially-inward from the tubular sidewall 202 to define an annular shoulder 206 that can support the terminal (e.g., lower) end 126 of the anode can 102 when the cell 100 is assembled. The terminal (e.g., upper) end 128 of the cathode can 104 is crimped over the edge margin of the top of the anode can 102 to secure the cell 100 in its assembled configuration. The grommet 200 and button cell 100, generally, can be formed using manufacturing processes shown and described in U.S. Pat. No. 8,003,251, entitled "ELECTROCHEMICAL CELL GROMMET HAVING A SIDEWALL WITH A NONUNIFORM THICKNESS," which is hereby incorporated by reference in its entirety.

When the cell 100 is being discharged, the cell 100 takes in atmospheric oxygen through openings 130 formed in the bottom of the cathode can 104 and converts the oxygen to hydroxyl ions in the air cathode assembly 106 by interaction with the electrolyte. The hydroxyl ions then migrate to the anode material 110, where the ions interact with the metal anode material 110, which undergoes an oxidation reaction forming, for example, zinc oxide while simultaneously releasing energy. The energy released during the oxidation reaction can be transferred to a battery terminal (not shown) through the anode can 102, for example, to power an electronic device.

Because the energy releasing process relies on oxidizing the metal anode material 110 contained within the cell 100, the overall capacity (e.g., useful life) of the cell 100 is generally tied to the quantity of electrochemically reactive materials (e.g., the volume of anode materials) contained within the interior of the cell 100. Finite anode material 110 storage limits for each cell 100 dictated by cathode can 104 size constraints are such that the battery cell 100 may not outlive the device it is intended to power. As several battery cells 100 may be needed to power a single electronic device over its lifetime, the battery cells 100 are designed to be removable, replaceable, and mass producible.

The manufacturability of the battery cell 100 is intimately tied to the design of the grommet 200, which is shown in additional detail in FIGS. 2A-2D. The contour of the grommet 200 is designed to facilitate rapid and mass production of grommets 200 through an injection molding process. For example, a two-piece core pin mold can be used to create grommets 200 out of a dielectric material, such as nylon-6,6 (e.g., Zytel 101, commercially available from DuPont). As explained below, additional features can be incorporated into the grommet 200 to help efficiently eject each grommet 200 from the mold and eliminate or reduce other problems often encountered during grommet mass production, including component stacking. The foregoing and following structural description of the grommet 200 also applies to the grommet 200', shown in FIG. 5, which only differs from the grommet 200 by way of a differently configured pull ring 214, 214', as explained below.

As discussed previously, the grommet 200 has a generally tubular sidewall 202 extending about the longitudinal axis X-X. The generally tubular sidewall 202 includes a lower portion 208 and an upper portion 210 extending away from the lower portion 208. The upper portion 210 tapers outwardly away from the longitudinal axis X-X as it extends axially (e.g., upwardly) away from the lower portion 208. The lower portion 208, conversely, can be defined by a near-constant radius, excluding the foot 204. The near-constant cross-section of the lower portion 208 can create an inflection 212 between the lower portion 208 and the upper portion 210, which is defined by a radius that varies (e.g., increases) in size as it extends away from the lower portion 208. The taper of the upper portion 210 relative to the lower portion 208 can help facilitate ejection of the grommet 200 from an injection molding apparatus and help guide the anode can 102 into the grommet 200 during cell 100 assembly. In some embodiments, the material thickness of the sidewall 202 increases as the upper portion 210 extends upwardly and outwardly away from the lower portion 208, as explained in detail in the '251 patent discussed above and previously incorporated by reference.

A discontinuous pull ring 214 is formed in the upper portion 210 of the sidewall 202 to further facilitate the removal of grommets 200 from injection molds. The pull ring 214 can provide points of engagement for a core pin (not shown) to consistently engage and eject grommets 200 from the same portion of each injection mold. For example, the pull ring 214 can engage metal detents formed in the core pin. When the injection molding process is complete, the core pin is pulled away from the cavity side of the mold. The engagement between the pull ring 214 and the metal detents in the core pin pulls each grommet from the mold cavity in concert with the core pin, to a common finished part location. The grommets 200 can then be ejected from the core pins. Molded grommets 200 can then be more easily collected, sorted, and transported for button cell 100 assembly.

Figure 5:
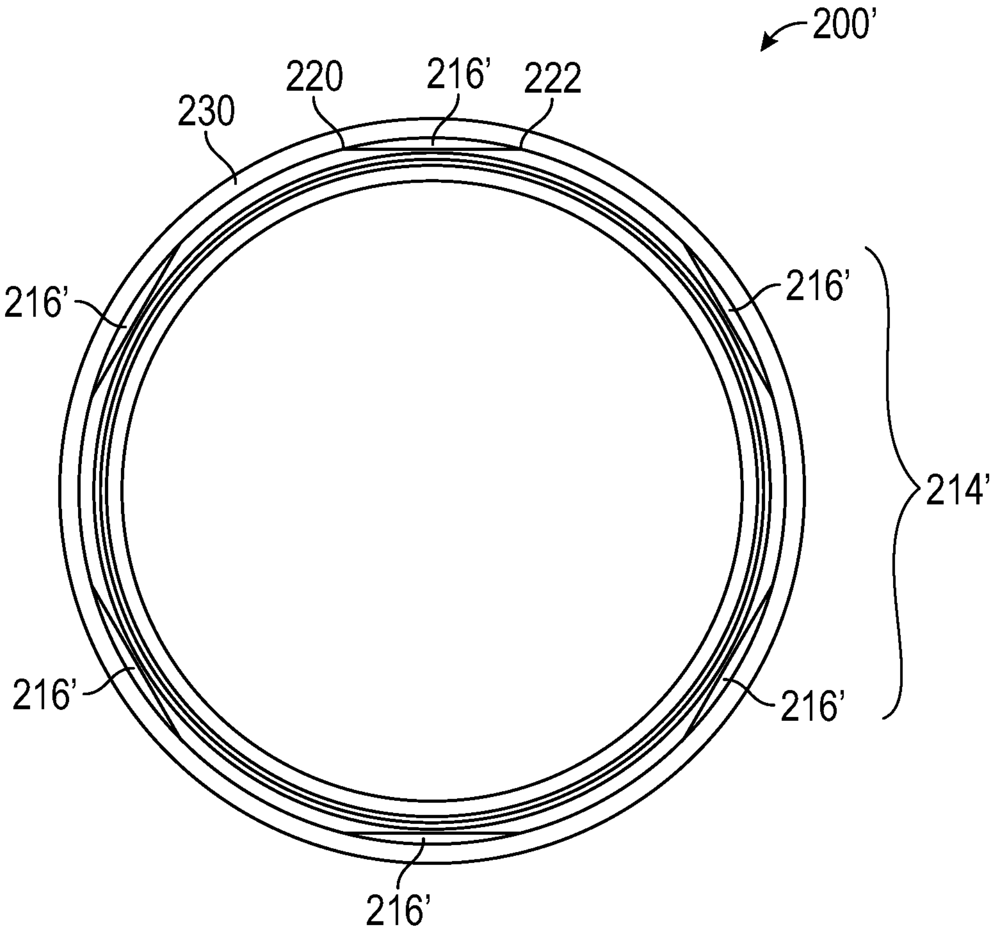
FIG. 5 is a top view of another grommet that can be incorporated into the electrochemical button cell of FIG. 1A.

The discontinuous pull ring 214 is formed by a group of projections 216 extending radially inward away from the tubular wall 202 toward the longitudinal axis X-X. The projections 216 in the pull ring 214 are angularly spaced apart from other projections 216 about the upper portion 210. In some embodiments, the pull ring 216 includes two or more projections 216 extending inward from the upper portion 210. For example, four projections 216 can be evenly spaced apart from one another about the upper portion 210 of the sidewall 202. Optionally, and as depicted in FIG. 5, the pull ring 214' can include six projections 216' spaced about the grommet 200'. In some embodiments, each projection 216, 216' in the pull ring 214, 214' is uniformly sized and axially aligned with each other projection 216, 216' in the pull ring 214, 214'.

The projections 216 can be defined by a base 218 having a first end 220 and a second end 222. The base 218 can extend between the first end 220 and the second end 222 coincidentally with an inner surface of the sidewall 202. In some embodiments, the projections 216 include a convex lower surface 224 and a convex upper surface 226. Each of the convex lower surface 224 and the convex upper surface 226 extend between the first end 220 and the second end 222. The lower surface 224 extends away from the first end 220 and curves axially downward, toward the lower portion 208 of the tubular sidewall 202. At a midpoint 228 between the first end 220 and the second end 222, the lower surface 224 can reach a minimum that corresponds to a lowermost point of the projection 216. As the lower surface 224 extends away from the midpoint 228 toward the second end 222, the lower surface 224 can curve axially upward until it reaches the second end 222. In an opposite fashion, the upper surface 226 can extend away from the first end 220 and curve axially upward, toward a top surface 230 of the grommet 200. At a midpoint 232 between the first end 220 and the second end 222, the upper surface 226 can reach a maximum that corresponds to an uppermost point of the projection 216. As the upper surface 226 extends away from the midpoint 232 toward the second end 222, the upper surface 226 curves axially downward until it reaches the second end 222.

An edge 234 can be formed in each projection 216 at the junction between the upper surface 226 and the lower surface 224. In some embodiments, the edge 234 is defined by an arc having a convex shape. For example, the edge 234 can curve away from the first end 220 radially inward toward the longitudinal axis X-X and toward the second end 222. The edge 234 extends inward to a local maximum 236, which can be formed at a midpoint between the first end 220 and the second end 222. The local maximum 236 can correspond to an innermost point (e.g., closest to the longitudinal axis) on the projection 216. The edge 234 can then curve away from the local maximum 236, radially outward to the second end 222. In some embodiments, the edge 234 of the projection 216 forms a chord between the first end 220 and the second end 222.

The combination of the lower surface 224, the upper surface 226, and the edge 234 can give each projection 216 a generally triangular cross-section. If the edge 234 has a convex shape, as described above, the cross-section of each projection 216 varies as it extends inwardly away from the sidewall 202. The cross-section of each projection 216 increases in size as it extends away from the first end 220, until it reaches the local maximum 236. The cross-section of the projection 216 will be largest at the local maximum 236, which also creates a location of maximum material thickness on the upper portion 210 of the sidewall 202. The locations of maximum material thickness can be between about 1.2 and 2.0 times thicker, or between about 1.4 and about 1.7 times thicker than any location on the upper portion 210 excluding projections 216, for example. The cross-section of the projection 216 then decreases in size as it approaches the second end 222.

The angular spacing between each projection 216 in the discontinuous pull ring 214 can depend upon the size of each projection. In some embodiments, the first end 220 and the second end 222 of each projection 216 are spaced apart from one another angularly about the sidewall 202 by between about 5 degrees and about 60 degrees. For example, each end 220, 222 could be spaced apart angularly by between 20 degrees and 40 degrees, or about 30 degrees. Each local maximum 236 can be angularly spaced apart from each adjacent maximum 236 by about 90 degrees, for example, when four projections 216 make up the discontinuous pull ring 214. If six projections 216' make up the discontinuous pull ring 214', as shown in FIG. 5, each local maximum 236 could be angularly spaced apart from each adjacent maximum by about 60 degrees. In some embodiments, projections 216 in the discontinuous pull ring 214 can be variably spaced apart from adjacent projections 216.

Figure 3B:
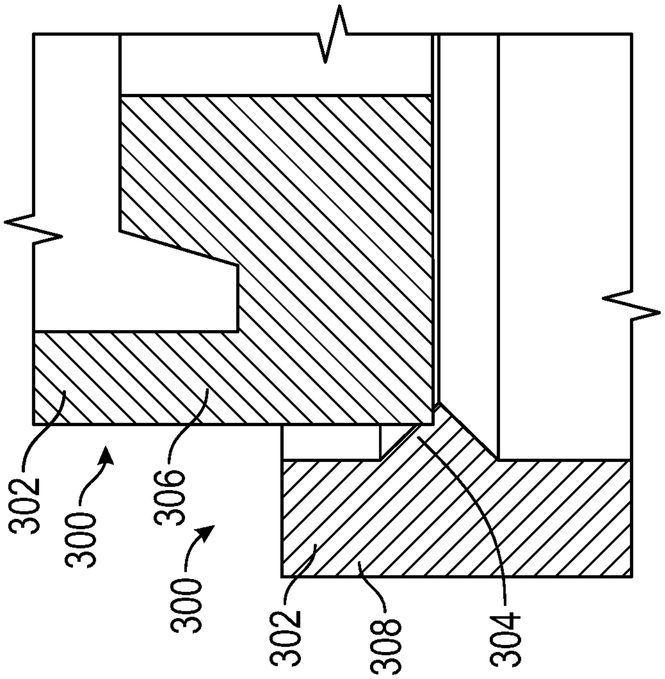
FIG. 3B (Prior Art)
FIG. 3B is a detailed section view of the interaction between prior art grommets of FIG. 3A, taken along the dashed box 3B-3B in FIG. 3A.
Figure 3A:
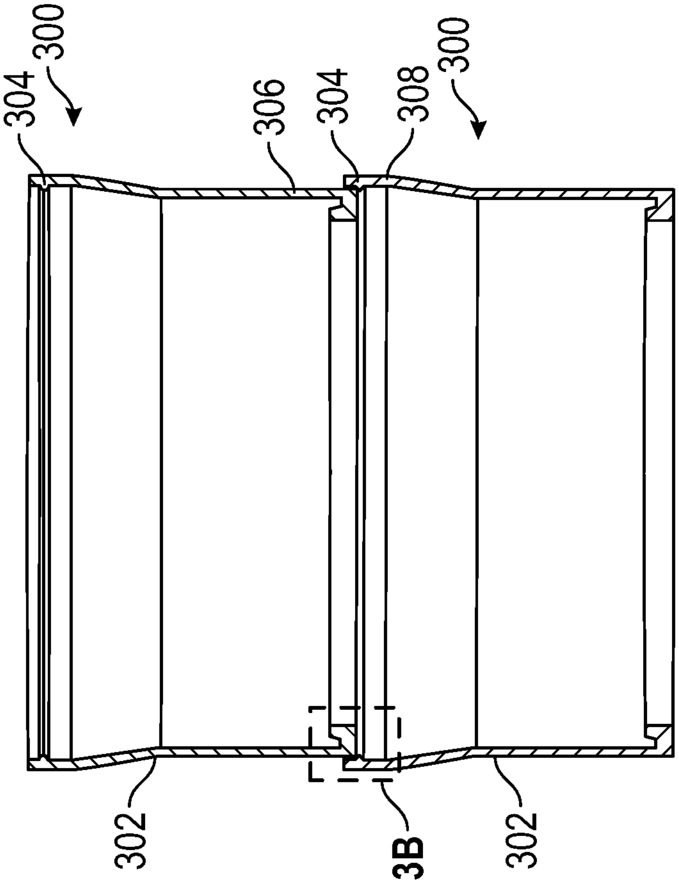
FIG. 3A (Prior Art)
FIG. 3A is a cross-sectional view of two prior art grommets stacking upon one another.

The projections 216 can reduce or prevent the nesting of components that may otherwise occur when removing grommets 200 from the injection molds or when transporting or otherwise preparing grommets 200 for button cell 100 assembly. Nesting, as illustrated in FIGS. 3A and 3B, is a commonly-encountered problem when manufacturing prior art grommets and button cells. Even with a pull ring 304 extending away from the sidewall 302, the lower portion 306 of grommets 300 has a tendency to get stuck in or nested with the upper portion 308 of another grommet 300. Nested grommets 300 create inefficiency within the manufacturing and assembly processes, as time must be spent to individually separate grommets 300 before button cells can be assembled.

Nesting typically occurs within prior art grommets 300 because there is a minimal amount of interference (e.g., overlap) between the diameter of the continuous pull ring 304 and the lower portion 306 of each grommet 300. Increasing the size of the pull ring 304 is not a feasible solution, as the diameter of the continuous pull ring 304 limits the size of the anode can 102 that can be received within the grommet 300, which in turn limits the capacity of the resultant button cell produced using the grommet 300. The continuous nature of the pull ring 304 also reinforces the entire pull ring 304 and sidewall 302 of the grommet 300, which reduces the resiliency of each grommet 300 and further limits the size available for an anode can (e.g., the anode can 102). By extending around the entire grommet 300, the pull ring 304 also increases the circularity of the upper portion 308 of each grommet 300. Circularity in both the upper portion 308 and the lower portion 306 of each grommet 300 creates near-complimentary shapes that even further increase the likelihood that component nesting will occur.

Figure 4:
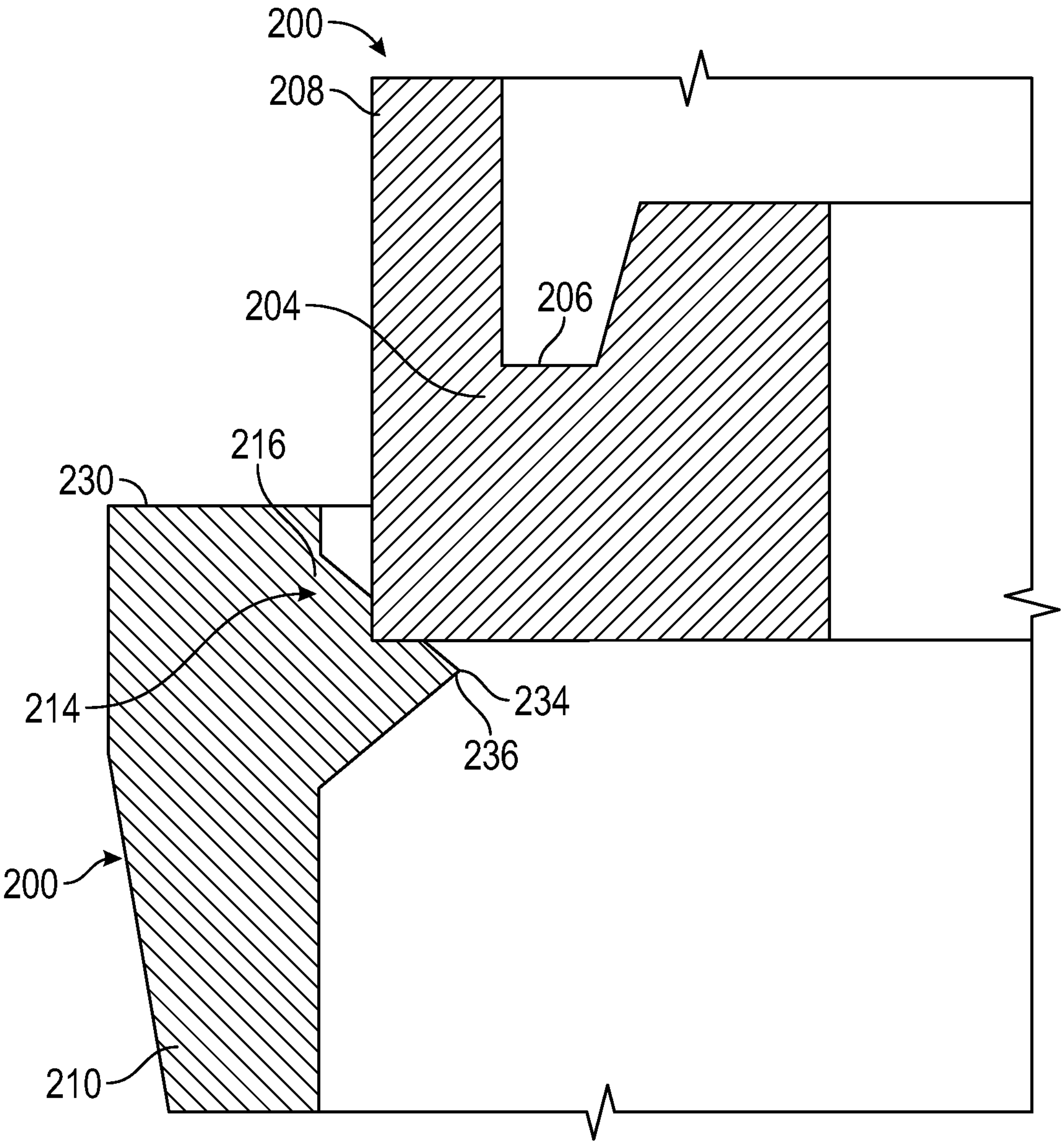
FIG. 4 is a detailed section view of an interaction between two of the grommets shown in FIG. 2A, resisting stacking.

The projections 216 can prevent or greatly reduce the probability of nesting in grommets 200 by creating additional interference between grommets 200 without significantly sacrificing anode can capacity within the grommet 200. As depicted in FIG. 4, the projections 216 are positioned proximate the top surface 230, which limits the degree to which another grommet 200 can enter into the upper portion 210 of each grommet 200. The projections 216 extend radially inward to create separate points of maximum interference with the foot 204 of another grommet 200 at each local maximum 236. Each local maximum 236 creates points of maximum interference between grommets 200 that are between 2.5 and 3.0 times greater than the interference between the continuous pull ring 304 and prior art grommets 300. For example, the grommets 200, 300 each have approximately the same anode can capacity, while the grommets 200 provide about 0.0081 inches of interference, while the grommets 300 provide only 0.0030 inches of interference.

The anode can capacity of the grommets 200 is preserved by the projection 216 contour, which offers greater flexure than the pull ring 304. Because the pull ring 214 is discontinuous, the overall volume of dielectric material (e.g., nylon-6,6) that needs to be compressed during cell closure (i.e., button cell 100 assembly) is substantially minimized, and does not impact a required gap between the anode can 102 and the cathode can 104. The material in each projection 216 is not reinforced by a continuous ring about the entire grommet 200, so compressing each projection 216 can be localized to a portion of the sidewall 202 surrounding each respective projection 216. By eliminating a continuous reinforcing ring from the upper portion 210 of the grommet 200, the top portion 210, as a whole, retains additional resiliency over the grommets 300 that allows significantly greater interference between the pull ring 214 without substantially sacrificing anode can 102 capacity.

The discontinuous nature of the pull ring 214 also introduces or permits a finite amount of ovality (i.e., non-circularity) in the upper portion 210 to further resist nesting. Because each projection 216 is spaced apart from one another, extended portions of the upper portion 210 are not reinforced, which can allow the upper portion 2110 to relax into a more oval shape than prior art grommets 300 using a continuous pull ring 304. Ovality in the upper portion 210 can further prevent nesting with other grommets 200 by creating slightly mismatched grommet 200 shapes between the lower portion 208 and the upper portion 210 of each grommet 200, which might otherwise be prone to nesting. The difference between the more circular lower portion 208 and the more oval upper portion 210 creates additional interference between the more circular lower portion 208 and the upper portion 210 of each grommet 200, which further resists nesting. Using the discontinuous pull ring 214, grommets 200 can be manufactured, transported, and assembled into button cells 100 efficiently with a reduced likelihood of component nesting.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples). The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A grommet for use in an electrochemical button cell to electrically insulate an anode can from a cathode can of the button cell, the grommet comprising:

a generally tubular sidewall having an upper portion and a lower portion extending around a longitudinal axis, the upper portion tapering outwardly and upwardly away from the lower portion, and the lower portion having a foot extending radially-inward away from the generally tubular sidewall; and a plurality of projections spaced apart from one another forming a single discontinuous pull ring, wherein the single discontinuous pull ring is positioned proximate to a top surface of the upper portion and the plurality of projections extend radially inward from the upper portion of the generally tubular sidewall toward the longitudinal axis, wherein the plurality of projections comprises four projections, and wherein each of the plurality of projections are defined by a triangular cross-sectional shape having an apex, wherein each apex defines a location of a maximum material thickness in the upper portion that is between 1.2 and 2.0 times thicker than a location in the upper portion not having the discontinuous pull ring, and wherein each apex of the plurality of projections are spaced about the upper portion by about 90 degrees, and wherein the material thickness of each apex and the angular spacing cause the upper portion to have an oval shape.

2. The grommet of claim 1, wherein each projection extends convexly inward from the upper portion.

3. The grommet of claim 2, wherein each projection extends inward toward the longitudinal axis to define an apex positioned at a local minimum distance away from the longitudinal axis.

4. The grommet of claim 1, wherein a cross-section of each of the plurality of projections varies as it extends inwardly away from the generally tubular sidewall.

5. The grommet of claim 1, wherein the grommet is formed of a dielectric material.

6. The grommet of claim 1, wherein a material thickness of the upper portion increases as it extends away from the lower portion.

7. The grommet of claim 6, wherein an axial position of the apex of each projection defines the location of maximum material thickness in the upper portion.

8. The grommet of claim 1, wherein each projection in the plurality of projections is axially aligned with each projection.

9. The grommet of claim 1, wherein each projection includes an outer edge defining a chord in the generally tubular sidewall.

10. The grommet of claim 1, wherein each projection is defined by a base including a first end and a second end, the first end and the second end angularly spaced apart the upper portion of the generally tubular sidewall by between about 15 degrees and about 45 degrees.

11. The grommet of claim 10, wherein the first end and the second end are angularly spaced apart by about 30 degrees.

12. A grommet for use in an electrochemical button cell to electrically insulate an anode can from a cathode can of the button cell, the grommet comprising:

a generally tubular sidewall having an upper portion and a lower portion extending around a longitudinal axis, the upper portion tapering outwardly and upwardly away from the lower portion, and the lower portion having a foot extending radially-inward away from the generally tubular sidewall; and a plurality of projections spaced apart from one another forming a single discontinuous pull ring, wherein the single discontinuous pull ring is positioned proximate to a top surface of the upper portion and the plurality of projections extend radially inward from the upper portion of the generally tubular sidewall toward the longitudinal axis, wherein the plurality of projections comprises four projections, and wherein each of the plurality of projections includes an apex having a material thickness, wherein each apex of the plurality of projections are spaced angularly about the upper portion by about 90 degrees, and wherein the material thickness of each apex and the angular spacing cause the upper portion to have an oval shape.

13. A grommet for use in an electrochemical button cell to electrically insulate an anode can from a cathode can of the button cell, the grommet comprising:

a generally tubular sidewall having an upper portion and a lower portion extending around a longitudinal axis, the upper portion tapering outwardly and upwardly away from the lower portion, and the lower portion having a foot extending radially-inward away from the generally tubular sidewall; and a plurality of projections spaced apart from one another forming a single discontinuous pull ring, wherein the single discontinuous pull ring is positioned proximate to a top surface of the upper portion and the plurality of projections extend radially inward from the upper portion of the generally tubular sidewall toward the longitudinal axis, wherein at least one each of the plurality of projections is defined by a triangular cross-sectional shape, wherein each of the plurality of projections includes an apex having a material thickness, and wherein each apex of the plurality of projections are spaced angularly about the upper portion by about 90 degrees, and wherein the material thickness of each apex and the angular spacing cause the upper portion to have an oval shape.

14. A grommet for use in an electrochemical button cell to electrically insulate an anode can from a cathode can of the button cell, the grommet comprising:

a generally tubular sidewall having an upper portion and a lower portion extending around a longitudinal axis, the upper portion tapering outwardly and upwardly away from the lower portion, and the lower portion having a foot extending radially-inward away from the generally tubular sidewall; and a plurality of projections spaced apart from one another forming a single discontinuous pull ring, wherein the single discontinuous pull ring is positioned proximate to a top surface of the upper portion and the plurality of projections extend radially inward from the upper portion of the generally tubular sidewall toward the longitudinal axis, wherein each of the plurality of projections is defined by a cross-sectional shape having an apex, wherein the apex defines a location of maximum material thickness in the upper portion that is between 1.2 and 2.0 times thicker than a location in the upper portion not having the discontinuous pull ring, and wherein each apex of the plurality of projections are spaced angularly about the upper portion by about 90 degrees, and wherein the material thickness of each apex and the angular spacing cause the upper portion to have an oval shape.

15. An electrochemical cell comprising:

a cathode comprising an electrically conductive cathode can having a bottom wall and a sidewall extending up from the base, the bottom wall and sidewall together defining a cavity of the cathode can;

an anode comprising an electrically conductive anode can having a top wall and a sidewall extending away from the top wall, the top wall and the sidewall of the anode can together defining a cavity of the anode can, the anode can being at least partially disposed in the cathode can with at least a portion of the anode can sidewall in a generally opposed relationship with at least a portion of the cathode can sidewall; and a grommet positioned between the cathode can sidewall and the anode can sidewall, the grommet comprising:

a generally tubular sidewall having an upper portion and a lower portion extending around a longitudinal axis, the lower portion having a foot extending radially-inward away from the generally tubular sidewall; and a plurality of projections spaced apart from one another forming a single discontinuous pull ring, wherein the single discontinuous pull ring is positioned proximate to a top surface of the upper portion and the plurality of projections extend radially inward from the upper portion of the generally tubular sidewall toward the longitudinal axis, wherein the plurality of projections comprises four projections, wherein each of the plurality of projections are defined by a triangular cross-sectional shape having an apex, wherein each apex defines a location of a maximum material thickness in the upper portion that is between 1.2 and 2.0 times thicker than a location in the upper portion not having the discontinuous pull ring, and wherein each apex of the plurality of projections are spaced angularly about the upper portion by about 90 degrees, and wherein the material thickness of each apex and the angular spacing cause the upper portion to have an oval shape.

16. An electrochemical cell comprising:

a cathode comprising an electrically conductive cathode can;

an anode comprising an electrically conductive anode can at least partially disposed within the cathode can;

electrochemical material disposed within the anode can; and a grommet positioned between the cathode can and the anode can, the grommet comprising:

a generally tubular sidewall having an upper portion and a lower portion extending around a longitudinal axis, the lower portion having a foot extending radially-inward away from the generally tubular sidewall, and wherein the lower portion is a circular shape and the upper portion is a non-circular shape; and a plurality of projections spaced apart from one another forming a single discontinuous pull ring, wherein the single discontinuous pull ring is positioned proximate to a top surface of the upper portion and the plurality of projections extend radially inward from the generally tubular sidewall toward the longitudinal axis, wherein the plurality of projections comprises four projections, wherein each of the plurality of projections are defined by a triangular cross-sectional shape having an apex, wherein each apex defines a location of a maximum material thickness in the upper portion that is between 1.2 and 2.0 times thicker than a location in the upper portion not having the discontinuous pull ring, and wherein each apex of the plurality of projections are spaced angularly about the upper portion by about 90 degrees, and wherein the material thickness of each apex and the angular spacing cause the upper portion to have an oval shape.

* * * * *